(12) United States Patent
Amidi

(10) Patent No.: US 8,633,853 B2
(45) Date of Patent: Jan. 21, 2014

(54) METHOD AND APPARATUS FOR LOCATION DETECTION USING GPS AND WIFI/WIMAX

(75) Inventor: Soroush Amidi, Montreal (CA)

(73) Assignee: Honeywell International Inc., Morristown, NJ (US)

( * ) Notice: Subject to any disclaimer, the term of this patent is extended or adjusted under 35 U.S.C. 154(b) by 402 days.

(21) Appl. No.: 12/183,876

(22) Filed: Jul. 31, 2008

(65) Prior Publication Data
US 2010/0026569 A1 Feb. 4, 2010

(51) Int. Cl.
*G01S 19/48* (2010.01)
*G01S 19/12* (2010.01)

(52) U.S. Cl.
USPC .................. 342/357.31; 342/357.49

(58) Field of Classification Search
USPC .................... 342/357.31, 357.49
See application file for complete search history.

(56) References Cited

U.S. PATENT DOCUMENTS

| | | | |
|---|---|---|---|
| 5,051,741 A * | 9/1991 | Wesby | 342/44 |
| 5,129,605 A | 7/1992 | Burns et al. | |
| 5,663,734 A * | 9/1997 | Krasner | 342/357.25 |
| 6,021,330 A * | 2/2000 | Vannucci | 342/457 |
| 6,034,603 A | 3/2000 | Steeves | |
| 6,255,988 B1 * | 7/2001 | Bischoff | 342/357.31 |
| 6,324,471 B1 * | 11/2001 | Katayama et al. | 342/357.25 |
| 6,363,323 B1 | 3/2002 | Jones | |
| 6,473,038 B2 | 10/2002 | Patwari et al. | |
| 6,570,487 B1 | 5/2003 | Steeves | |
| 6,768,909 B1 * | 7/2004 | Irvin | 455/456.5 |
| 6,850,502 B1 | 2/2005 | Kagan et al. | |
| 6,961,541 B2 | 11/2005 | Overy et al. | |
| 7,005,985 B1 | 2/2006 | Steeves | |
| 7,027,416 B1 | 4/2006 | Kriz | |
| 7,286,158 B1 | 10/2007 | Griebenow | |
| 7,379,729 B2 | 5/2008 | Holland et al. | |
| 7,518,499 B2 | 4/2009 | Werenka | |
| 7,640,007 B2 | 12/2009 | Chen et al. | |
| 7,853,250 B2 | 12/2010 | Harvey et al. | |
| 8,223,012 B1 | 7/2012 | Diem | |
| 2002/0019698 A1 * | 2/2002 | Vilppula et al. | 342/357.08 |
| 2003/0085841 A1 * | 5/2003 | Spilker et al. | 342/464 |
| 2004/0029558 A1 | 2/2004 | Liu | |
| 2005/0128074 A1 * | 6/2005 | Culpepper et al. | 340/539.1 |
| 2005/0201349 A1 | 9/2005 | Budampati | |
| 2005/0281215 A1 | 12/2005 | Budampati et al. | |
| 2006/0002368 A1 | 1/2006 | Budampati et al. | |
| 2006/0046664 A1 | 3/2006 | Paradiso et al. | |
| 2006/0063523 A1 | 3/2006 | McFarland | |

(Continued)

OTHER PUBLICATIONS

IEEE Std 802.11—2007, title page, 2007.*

(Continued)

*Primary Examiner* — Jack W Keith
*Assistant Examiner* — Fred H Mull

(57) ABSTRACT

A system, apparatus and method are provided for location detection using GPS or WiFi/WiMAX. The apparatus includes a global positioning system (GPS) receiver, a transceiver, and a controller. The transceiver is a WiFi or WiMAX transceiver. The controller determines whether GPS location sensing is possible and, if so, receives geographical location data from the GPS receiver. If GPS location sensing is not possible, the controller determines whether location sensing via the transceiver is possible and, if so, receives geographical location data from the transceiver. The controller sends a signal based on the location data to a location monitoring application via the transceiver. The controller may send a signal to the location monitoring application that no location sensing is possible.

20 Claims, 4 Drawing Sheets

(56) References Cited

U.S. PATENT DOCUMENTS

| | | | |
|---|---|---|---|
| 2006/0143292 A1 | 6/2006 | Taubenheim et al. | |
| 2006/0171344 A1 | 8/2006 | Subramanian et al. | |
| 2006/0171346 A1 | 8/2006 | Kolavennu et al. | |
| 2006/0174288 A1* | 8/2006 | Bichot et al. | 725/81 |
| 2006/0176169 A1 | 8/2006 | Doolin et al. | |
| 2006/0205417 A1* | 9/2006 | Ju et al. | 455/456.5 |
| 2006/0227729 A1 | 10/2006 | Budampati et al. | |
| 2006/0261940 A1 | 11/2006 | Defant et al. | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0030816 A1 | 2/2007 | Kolavennu | |
| 2007/0030832 A1 | 2/2007 | Gonia et al. | |
| 2007/0037588 A1 | 2/2007 | Mohi et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0132576 A1 | 6/2007 | Kolavennu et al. | |
| 2007/0132577 A1 | 6/2007 | Kolavennu | |
| 2007/0132637 A1 | 6/2007 | Kolavennu et al. | |
| 2007/0155401 A1* | 7/2007 | Ward et al. | 455/456.1 |
| 2007/0155423 A1 | 7/2007 | Carmody et al. | |
| 2007/0205886 A1 | 9/2007 | Huseth et al. | |
| 2007/0241901 A1 | 10/2007 | Cage et al. | |
| 2007/0241965 A1 | 10/2007 | Kolavennu et al. | |
| 2007/0268884 A1 | 11/2007 | Kolavennu et al. | |
| 2008/0076450 A1 | 3/2008 | Nanda et al. | |
| 2008/0109098 A1 | 5/2008 | Moshier et al. | |
| 2008/0109099 A1 | 5/2008 | Moshier | |
| 2008/0122641 A1 | 5/2008 | Amidi | |
| 2008/0123934 A1 | 5/2008 | Amidi | |
| 2008/0209521 A1 | 8/2008 | Malaney | |
| 2008/0267259 A1 | 10/2008 | Budampati et al. | |
| 2008/0273547 A1 | 11/2008 | Phinney | |
| 2008/0287068 A1* | 11/2008 | Etemad | 455/68 |
| 2008/0320419 A1* | 12/2008 | Matas et al. | 715/863 |
| 2009/0009327 A1 | 1/2009 | Amidi | |
| 2009/0010484 A1 | 1/2009 | Amidi | |
| 2009/0021390 A1 | 1/2009 | Amidi | |
| 2009/0115604 A1 | 5/2009 | Thomas et al. | |
| 2009/0176507 A1* | 7/2009 | Wu et al. | 455/456.2 |

OTHER PUBLICATIONS

L. Reyero et al., A pervasive indoor-outdoor positioning system, Journal of Networks, vol. 3(8), p. 70-83, Nov. 2008.* alarm. (2001). In Hargrave's Communications Dictionary, Wiley. Retrieved from http://www.credoreference.com/entry/hargravecomms/alarm.*

M. Rabinowitz et al., A new positioning system using television synchronization signals, IEEE Transactions on Broadcasting, vol. 51(1), p. 51-61, 2005.*

G.M. Djuknic et al., Geolocation and Assisted-GPS. White Paper, Mobility: 3G-CDMA2000 & UMTS, Lucent Technologies, Bell Labs, May 31, 2002.*

J.-C. Cousin et al., An indoor positioning system using GPS repeaters and AOA measurements, Proceedings of the 18th International Technical Meeting of The Satellite Division of The Institute of Navigation, p. 2743-2749, Dec. 2005.*

Dr. Soumitri Kolavennu, Presentation, "WNSIA MAC Layer", ISA SP100 meeting, Feb. 14, 2007, 24 pages, see esp. p. 17.

Soroush Amidi, "System and Method for Inventory Management", U.S. Appl. No. 12/024,267, filed Feb. 1, 2008.

Soroush Amidi, "Method and Apparatus for Intermittent Location Reporting", U.S. Appl. No. 12/183,964, filed Jul. 31, 2008.

Ramakrishna S. Budampati, et al., "Apparatus and Method for Deterministic Latency-Controlled Communications in Process Control Systems", U.S. Appl. No. 12/176,625, filed Jul. 21, 2008.

Jeffrey M. Becker, "System and Method for Providing Self-Locating Wireless Sensors", U.S. Appl. No. 12/183,263, filed Jul. 31, 2008.

"IntelaTrac PKS Redefines Field Data Collection and Management," Honeywell, Feb. 2006, 2 pages.

Honeywell Process Solutions, "IntelaTrac PKS," Honeywell, 2 pages.

"Powerful Calibration Management with DocuMint," Honeywell, Mar. 2008, 4 pages.

"Lumidor Minimax XT," Honeywell, Dec. 2005, 4 pages.

"PanOS Platform, Unified Location Management Platform," PanGo, 2007, 2 pages.

"Ekahau T301-A Wi-Fi Tag," ekahau, 2007, 2 pages.

"Improve Maintenance Efforts with DocuMint," Honeywell, Feb. 2006, 3 pages.

Honeywell Process Solutions, "Mobile Station," Honeywell, 3 pages.

"WiMAX", http://en.wikipedia.org/wiki/Wimax, Aug. 20, 2008, 17 pages.

Dongyan Chen et al., "Dependability Enhancement for IEEE 802.11 Wireless LAN with Redundancy Techniques," Proceedings of the 2003 International Conference on Dependable Systems and Networks, 2003, 8 pages.

* cited by examiner

METHOD AND APPARATUS FOR LOCATION DETECTION USING GPS AND WIFI/WIMAX

TECHNICAL FIELD

This disclosure relates generally to a location detection device and more specifically to a method and apparatus for location detection using GPS and WiFi or WiMAX.

BACKGROUND

Processing facilities are often managed using process control systems. Example processing facilities include manufacturing plants, chemical plants, crude oil refineries, ore processing plants, and coal or other types of mines. Such facilities may include both exterior and interior locations in which people and assets of the facility may be located and between which they may move.

People and asset tracking systems may be used to track the locations of various people and assets in a processing facility. These systems are routinely used as part of process control systems or security systems, allowing the systems to identify when people or assets enter predefined areas or when assets are moved to or from their designated locations.

SUMMARY

This disclosure provides a method and apparatus for location detection using GPS and WiFi or WiMAX.

In a first embodiment, a method includes determining, with a global positioning system (GPS) receiver in a location detecting device (LDD), whether location sensing via GPS is possible and, if location sensing via GPS is possible, sensing a geographical location of the LDD using the GPS receiver. The method also includes, if location sensing via GPS is not possible, determining, with a WiFi or WiMAX transceiver in the LDD, whether location sensing via the transceiver is possible. If location sensing via GPS is not possible but location sensing via the transceiver is possible, the method further includes sensing a geographical location of the LDD using the transceiver. The method further includes sending a signal based on the geographical location of the LDD to a location monitoring application via the transceiver.

In a second embodiment, an apparatus includes a global positioning system (GPS) receiver, a transceiver, and a controller. The transceiver comprises comprising a WiFi or WiMAX transceiver. The controller is adapted to determine, using the GPS receiver, whether location sensing via GPS is possible and, if location sensing via GPS is possible, receive location data associated with a geographical location of the apparatus from the GPS receiver. The controller is further adapted, if location sensing via GPS is not possible, to determine, using the transceiver, whether location sensing via the transceiver is possible and, if location sensing via GPS is not possible but location sensing via the transceiver is possible, to receive location data associated with a geographical location of the apparatus from the transceiver. The controller is still further adapted to send a signal based on the location data to a location monitoring application via the transceiver.

In a third embodiment, a system includes a location monitoring application and a location detecting device (LDD). The LDD includes a global positioning system (GPS) receiver, a transceiver that comprises a WiFi or WiMAX transceiver, and a controller. The controller is adapted to determine, using the GPS receiver, whether location sensing via GPS is possible and, if location sensing via GPS is possible, receive location data associated with a geographical location of the LDD from the GPS receiver. The controller is further adapted, if location sensing via GPS is not possible, to determine, using the transceiver, whether location sensing via the transceiver is possible and, if location sensing via GPS is not possible but location sensing via the transceiver is possible, to receive location data associated with a geographical location of the LDD from the transceiver. The controller is still further adapted to send a signal based on the location data to a location monitoring application via the transceiver.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
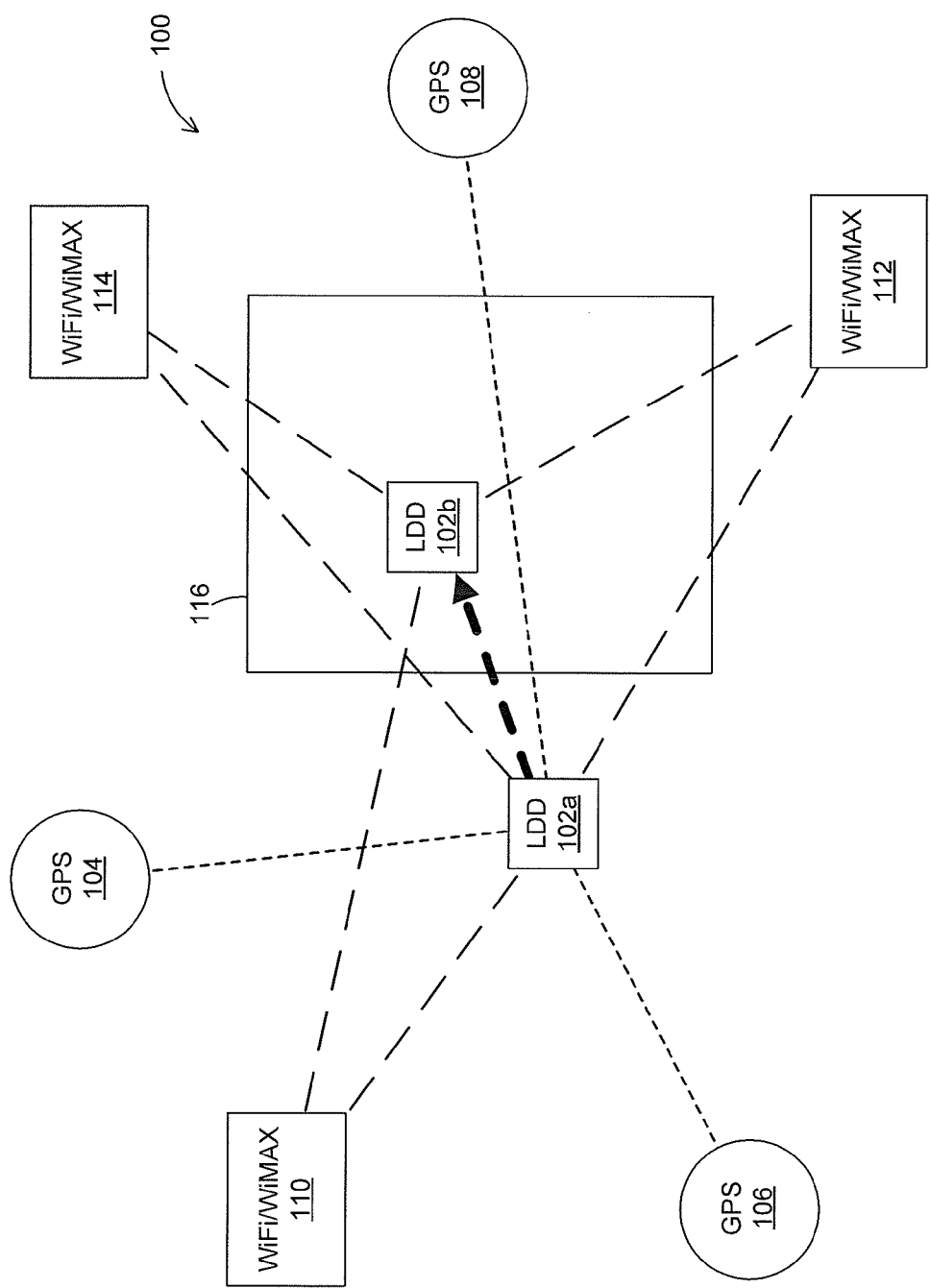
FIG. 1 presents a schematic overhead view of a processing facility and a location detecting device according to this disclosure.

FIG. 1 presents a schematic overhead view of a processing facility 100 and a location detecting device (LDD) 102 according to this disclosure. At one point in time, the LDD 102 may be positioned at the location 102a, where it is outside an enclosure 116. At another point in time, the LDD 102 may be moved to the location 102b, where it is inside the enclosure 116.

In one embodiment, the LDD 102 communicates wirelessly with one or more of nodes 110, 112 and 114 using the IEEE 802.11 standard (referred to as a "WiFi standard"). In other embodiments, the LDD 102 communicates wirelessly with one or more of the nodes 110, 112 and 114 using the IEEE 802.16 standard (referred to as a "WiMAX standard"). In this way, the LDD 102 is able to communicate information relating to its geographical location to a location monitoring application (not shown in FIG. 1) via one or more of the WiFi or WiMAX nodes 110, 112 and 114.

In location 102a, the LDD 102 receives transmissions from global positioning system (GPS) satellites 104, 106 and 108. In some embodiments, the LDD 102 includes a location detector that times the signals sent from the GPS satellites 104, 106 and 108 to calculate a geographical location of the LDD 102. In other embodiments, the LDD 102 sends information received from the GPS satellites 104, 106 and 108 to a separate location detector via one or more of the WiFi or WiMAX nodes 110, 112 and 114, and the separate location detector calculates the geographical location of the LDD 102.

In location 102a, the geographical location of the LDD 102 can also be calculated by triangulation from the wireless communication with the WiFi or WiMAX nodes 110, 112 and 114. Such triangulation may make use of time difference of arrival, time of arrival, angle of arrival, or other techniques. The LDD 102 may combine information extracted from the communications themselves with information provided by the WiFi or WiMAX nodes 110, 112 and 114. In some embodiments, a location detector located in the LDD 102 may perform such triangulation calculations. In other embodiments, the LDD 102 may communicate the collected location data via one or more of the WiFi or WiMAX nodes 110, 112 and 114 to a location detector, which performs the triangulation calculations.

When the LDD 102 is at the location 102a, location detection by either GPS or WiFi/WiMAX triangulation techniques are possible. In such locations, use of GPS location detection is preferred because of increased accuracy and reduced processing load on the LDD 102 and the WiFi or WiMAX nodes 110, 112 and 114.

When the LDD 102 moves to the location 102b, it is inside the enclosure 116 and is no longer able to receive transmissions from the GPS satellites 104, 106 and 108. At the location 102b, however, the LDD 102 is still in wireless communication with the WiFi or WiMAX nodes 110, 112 and 114. As such, at location 102b, the LDD 102 is able to determine that location detecting using GPS is not possible but location detecting using WiFi or WiMAX is still possible. Therefore, at location 102b, the LDD 102 will continue to collect location data from the wireless communication with the WiFi or WiMAX nodes 110, 112 and 114 for calculation of its geographical location.

While the LDD 102 is shown in FIG. 1 as communicating with three GPS satellites and three WiFi/WiMAX nodes, it will be understood that location detection according to this disclosure may also be performed while in communication with more than three GPS satellites or WiFi/WiMAX nodes. In some embodiments, the LDD 102 is a stand-alone device that is physically attached to an asset or worn by a person. In other embodiments, the LDD 102 is an integrated element of an asset, such as a portable computer or personal digital assistant.

In some embodiments, one or more of the WiFi or WiMAX nodes 110, 112 and 114 is a 'beacon' or broadcast-only node that only provides a signal for the LDD 102 to receive and use in calculating its position. In such embodiments, the LDD 102 will use a fully functional one of the WiFi or WiMAX nodes 110, 112 and 114 to send its location data to the location monitoring application.

Figure 2:
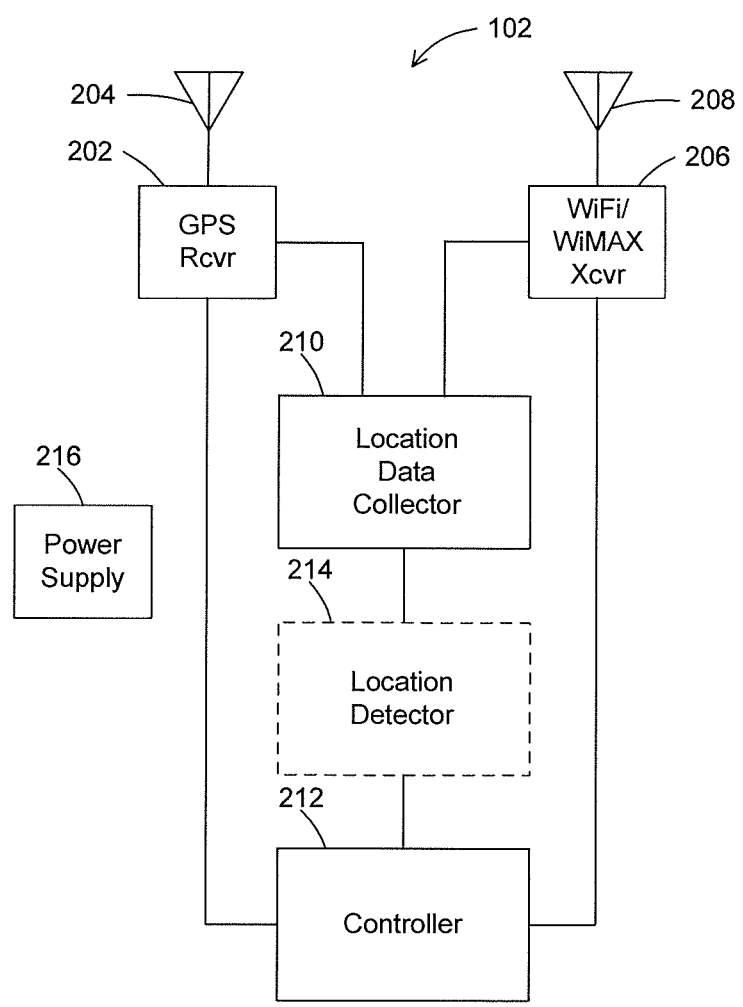
FIG. 2 presents a block diagram of a location detecting device according to this disclosure.

FIG. 2 presents a block diagram of the location detecting device (LDD) 102 according to this disclosure. The LDD 102 includes a global positioning system (GPS) receiver 202, which is coupled to a GPS antenna 204. The LDD 102 also includes a transceiver 206 coupled to an antenna 208. In some embodiments, the transceiver 206 is a WiFi transceiver; in other embodiments, the transceiver 206 is a WiMAX transceiver.

A location data collector 210 is coupled to both the GPS receiver 202 and the transceiver 206 and operates to collect location data from the signals received by either or both of the GPS receiver 202 and the transceiver 206. Such data may be found in measured characteristics of the signals themselves-such as their time or angle of arrival. Such data may come from information communicated by the signals-such as GPS timing information or angle-of-arrival of signals from the LDD 102, measured by a WiFi/WiMAX node and transmitted back to the LDD 102.

A controller 212 is coupled to the location data collector 210, the GPS receiver 202, and the transceiver 206. Based upon information received from the GPS receiver 202 and/or the location data collector 210, the controller 212 is able to determine whether location detection via GPS is possible. Based upon information received from the transceiver 206 and/or the location data collector 210, the controller 212 is able to determine whether location detection via WiFi or WiMAX is possible. Based upon the determination of whether location detection is possible via GPS and/or WiFi/WiMAX, the controller 212 uses the location data collector 210 to collect GPS or WiFi/WiMAX location data.

The controller 212 sends the location data to a location monitoring application (not shown in FIG. 2) via the transceiver 206. Where location detection is not possible via either GPS or WiFi/WiMAX, the controller 212 sends a signal indicative of that situation to the location monitoring application. The controller 212 also sends an identifier associated with the LDD 102 to the location monitoring application.

In some embodiments, the LDD 102 includes a location detector 214, coupled to the location data collector 210 and the controller 212. The controller 212 uses the location detector 214 to calculate a geographical location of the LDD 102 from the location data collected by the location data collector 210. The controller 212 sends the geographical location calculated by the location detector 214 to the location monitoring application via the transceiver 206.

A power supply 216 provides electrical power as needed to the other elements of the LDD 102 via electrical connections that are not shown in FIG. 2. It will be understood that certain components shown as distinct entities in FIG. 2 may be combined into integrated components. As a particular example, the location data collector 210 and the controller 212 could be constructed as a single processing element.

Figure 3:
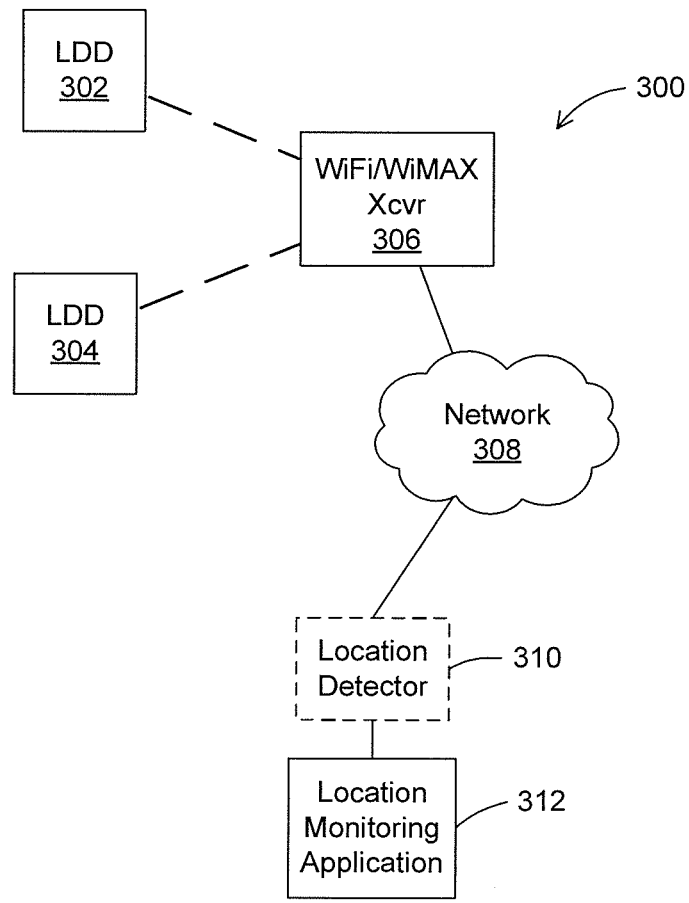
FIG. 3 presents a block diagram of a location monitoring system according to this disclosure.

FIG. 3 presents a block diagram of a location monitoring system 300 according to this disclosure. Location detection device (LDD) 302 and LDD 304 are in wireless communication with a transceiver 306. The transceiver 306 may be a WiFi transceiver or a WiMAX transceiver. A network 308 communicatively couples the transceiver 306 to a location monitoring application (LMA) 312. The network 308 may be a wireless network or a wireline network. Regardless of the type of network 308, both the transceiver 306 and the LMA 312 may couple to the network 308 either by wire or wirelessly. The LDDs 302 and 304 send location data to the LMA 312 via the transceiver 306 and the network 308.

In embodiments where the LDD 302 includes a location detector 214 (as shown in FIG. 2), the LDD 302 sends its geographic location to the LMA 312. In embodiments where the LDD 304 does not include a location detector 214, the system 300 includes a location detector 310 that is coupled to the network 308 and the LMA 312. The location detector 310 receives location data sent by the LDD 304 and calculates a geographical location of the LDD 304. The location detector 310 sends the calculated geographical location of the LDD 304 to the LMA 312.

In this way, the LMA 312 receives information about the geographical locations of the LDDs 302 and 304. The LMA 312 also receives information from LDDs that are unable to detect their position via either GPS or WiFi/WiMAX. The LMA 312 further receives information identifying the LDDs 302 and 304. The LMA 312 may archive the location and identification information, along with associated timestamps, to permit later queries such as where assets or personnel are just before their LDDs report the inability to detect location, where assets or personnel are located in the processing facility, at what times and for how long. In other embodiments, a process control system (not shown in FIG. 3) receives asset or personnel geographic location information from the LMA 312 and activates alarms or performs other process control functions in response to the asset or person entering predefined areas of the processing facility, or an LDD reporting an inability to detect its location.

While the location detector 310 and the LMA 312 are shown as separate components of the system 300, it will be understood that in other embodiments they may be integrated into a single component. In yet other embodiments, the transceiver 306, location detector 310 and LMA 312 may all be integrated into a single component. In still other embodiments, the location detector 310 may be coupled to the LMA 312 via the network 308. While only a single transceiver 306 is shown in FIG. 3, it will be understood that any number of transceivers may link LDDs to the LMA 312.

Figure 4:
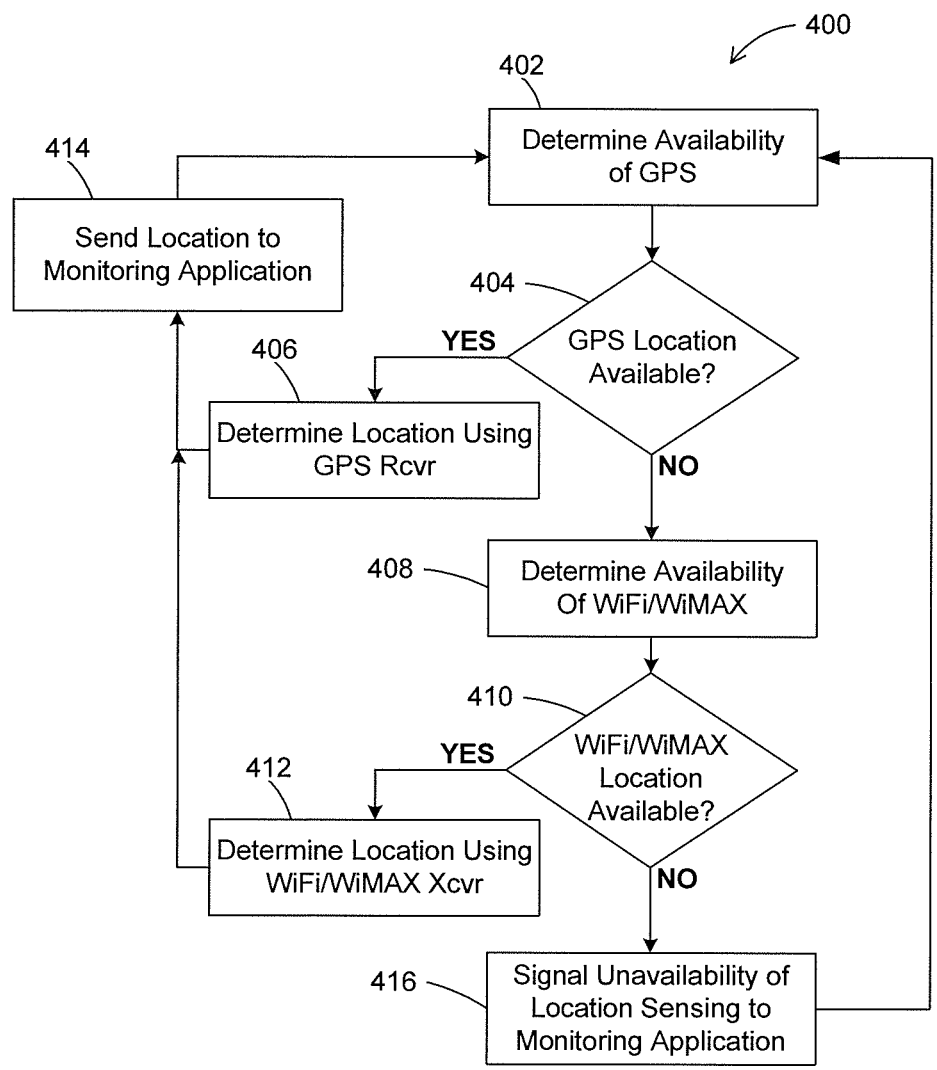
FIG. 4 presents a flow chart of a process for location detection according to this disclosure.

FIG. 4 presents a flow chart of a process 400 for location detection according to this disclosure. A location detection device (LDD) determines in step 402 whether GPS signals are available and whether location sensing via GPS may be performed. If location sensing via GPS is possible in step 404, the LDD proceeds to step 406 and collects GPS location data. Where the LDD includes a location detector, step 406 also includes determining the geographical location of the LDD from the location data. In step 414, the location data and/or geographical location determined from GPS location data is sent to a location monitoring application.

If it is determined in step 404 that location sensing via GPS is not possible, then the LDD determines in step 408 whether location sensing via wireless communications with WiFi or WiMAX nodes is possible. If location sensing via WiFi/WiMAX is possible in step 410, then the LDD proceeds to step 412 and collects WiFi/WiMAX location data. Where the LDD includes a location detector, step 412 also includes determining the geographical location of the LDD from the location data. In step 414, the location data and/or geographical location determined from WiFi/WiMAX location data is sent to a location monitoring application.

If it is determined in step 410 that WiFi/WiMAX location sensing is not possible, then in step 416 a signal is sent to the monitoring application that the LDD is unable to sense its location.

It may be advantageous to set forth definitions of certain words and phrases used throughout this patent document. The term "couple" and its derivatives refer to any direct or indirect communication between two or more elements, whether or not those elements are in physical contact with one another. The terms "over," "above," and the like denote relative positions of two or more elements in a particular orientation and do not require direct contact between the elements. The terms "include" and "comprise," as well as derivatives thereof, mean inclusion without limitation. The term "or" is inclusive, meaning and/or.

The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   determining, with a global positioning system (GPS) receiver in a location detecting device (LDD), whether location sensing via GPS is possible, the LDD attached to an asset in a processing facility, the asset configured to move between an outdoor location and an indoor location;
   if location sensing via GPS is possible, sensing a geographical location of the asset using the GPS receiver by (i) receiving location data from a plurality of GPS satellites, the location data based on the geographical location of the asset, and (ii) sending the location data to a remote location detector via a WiFi or WiMax transceiver, the remote location detector configured to calculate the geographical location of the asset based on content of the location data using at least one triangulation method and at least one angle of arrival among the content of the location data, the remote location detector further configured to transmit the geographical location to a location monitoring application remote from the asset;
   if location sensing via GPS is not possible, determining, with the WiFi or WiMax transceiver in the LDD, whether location sensing via the transceiver is possible;
   if location sensing via GPS is not possible and if location sensing via the transceiver is possible, sensing the geographical location of the asset using the transceiver by receiving beacon signals from a plurality of broadcast-only WiFi or WiMax beacon nodes and calculating the geographical location of the asset based on the received beacon signals;
   sending a signal to the location monitoring application via the transceiver and a receiving WiFi or WiMax node, the signal identifying one of the geographical location of the asset and an indication that location sensing of the asset is not possible; and
   activating an alarm in response to one of: (i) the signal indicating that the LDD is entering a specified area and (ii) the indication that location sensing of the LDD is not possible.

2. The method of claim 1, wherein receiving the location data comprises:
   receiving the location data from at least three GPS satellites.

3. The method of claim 1, wherein sensing the geographical location of the asset further comprises:
   receiving location data, the location data based on the geographical location of the asset; and
   determining the geographical location of the asset from the location data.

4. The method of claim 3, wherein receiving the location data comprises:
   receiving the location data from a plurality of sources.

5. The method of claim 1, wherein the indication that location sensing of the asset is not possible comprises an indication that location sensing via GPS is not possible and location sensing via the transceiver is not possible.

6. The method of claim 1, wherein the location monitoring application comprises a process control system.

7. The method of claim 1, further comprising:
   archiving the geographical location of the asset along with an identifier of the asset and an associated timestamp for the geographical location of the asset.

8. An apparatus, comprising:
a global positioning system (GPS) receiver configured to be attached to an asset in a processing facility, the asset configured to move between an outdoor location and an indoor location;
a WiFi or WiMax transceiver configured to be attached to the asset; and
a controller adapted to:
   determine, using the GPS receiver, whether location sensing via GPS is possible;
   if location sensing via GPS is possible, (i) receive location data originating at a plurality of GPS satellites and associated with a geographical location of the apparatus from the GPS receiver and (ii) send the location data to a remote location detector via a WiFi or WiMax transceiver, the remote location detector configured to calculate the geographical location of the asset based on content of the location data using at least one triangulation method and at least one angle of arrival among the content of the location data, the remote location detector further configured to transmit the geographical location to a location monitoring application remote from the asset;
   if location sensing via GPS is not possible, determine, using the WiFi or WiMax transceiver, whether location sensing via the transceiver is possible;
   if location sensing via GPS is not possible and if location sensing via the transceiver is possible, receive beacon signals from the transceiver and calculate the geographical location of the apparatus based on the received beacon signals, the beacon signals received at the transceiver from a plurality of broadcast-only WiFi or WiMax beacon nodes; and
   send a signal identifying one of the location data and an indication that location sensing of the asset is not possible to the location monitoring application via the transceiver and a receiving WiFi or WiMax node, the signal configured to activate an alarm in response to one of: (i) the signal indicating that the asset is entering a specified area and (ii) the indication that location sensing of the asset is not possible.

9. The apparatus of claim 8, wherein the location data is received from at least three GPS satellites.

10. The apparatus of claim 8, further comprising:
a location detector adapted to determine the geographical location of the apparatus from the location data;
wherein the controller is adapted to send to the location monitoring application the signal based on the geographical location of the apparatus deteiinined by the location detector.

11. The apparatus of claim 10, wherein the location data is received from a plurality of sources.

12. The apparatus of claim 8, wherein the indication that location sensing of the asset is not possible comprises an indication that location sensing via GPS is not possible and location sensing via the transceiver is not possible.

13. The apparatus of claim 8, wherein the location monitoring application comprises a process control system in the processing facility.

14. A system comprising:
a location monitoring application;
a remote location detector;
a plurality of broadcast-only WiFi or WiMax beacon nodes; and
a location detecting device (LDD) attached to an asset in a processing facility, the asset configured to move between an outdoor location and an indoor location, the LDD comprising:
   a global positioning system (GPS) receiver;
   a WiFi or WiMax transceiver; and
   a controller adapted to:
      determine, using the receiver, whether location sensing via GPS is possible;
      if location sensing via GPS is possible, (i) receive location data originating at a plurality of GPS satellites and associated with a geographical location of the asset from the GPS receiver and (ii) send the location data to the remote location detector via the WiFi or WiMax transceiver, the remote location detector configured to calculate the geographical location of the asset based on content of the location data using at least one triangulation method and at least one angle of arrival among the content of the location data, the remote location detector further configured to transmit the geographical location to the location monitoring application remote from the asset;
      if location sensing via GPS is not possible, determine, using the transceiver, whether location sensing via the transceiver is possible;
      if location sensing via GPS is not possible and if location sensing via the transceiver is possible, receive beacon signals from the transceiver and calculate the geographical location of the asset based on the received beacon signals, the beacon signals received at the transceiver from the beacon nodes; and
      send a signal identifying one of the location data and an indication that location sensing of the asset is not possible to the location monitoring application via the transceiver and a receiving WiFi or WiMax node;
   wherein the location monitoring application is adapted to activate an alarm in response to one of: (i) the signal indicating that the asset is entering a specified area and (ii) the indication that location sensing of the asset is not possible.

15. The system of claim 14, further comprising a network.

16. The system of claim 15, wherein the controller is adapted to send the signal based on the location data to the location detector through the network.

17. The system of claim 15, wherein the location data is received from at least three GPS satellites.

18. The system of claim 14, wherein:
the location detecting device further comprises a location detector adapted to determine the geographical location of the asset from the location data; and
the controller is adapted to send a signal based on the geographical location to the location monitoring application.

19. The system of claim 18, wherein the location data is received from a plurality of sources.

20. The system of claim 18, wherein the location monitoring application comprises a process control system in the processing facility.

* * * * *